May 27, 1947.  H. E. MOREY  2,421,214
RABBIT FEEDER
Filed Sept. 14, 1945

INVENTOR
HOWARD E. MOREY,
BY
ATTORNEYS

Patented May 27, 1947

2,421,214

UNITED STATES PATENT OFFICE 2,421,214

RABBIT FEEDER

Howard E. Morey, Aurora, Ill.

Application September 14, 1945, Serial No. 616,220

4 Claims. (Cl. 119—52)

My invention relates to an improved rabbit feeder for rabbits and other small mammals, the primary object of the invention being to provide an easily sanitized feeder which will prevent wastage and soiling of food by the rabbits or the like mammals, whether of solid or liquid variety, nosed out of the cup by the rabbits in feeding, and which will ensure the rabbits or the like getting their full distributed ration of food in unimpaired condition.

Another important object of the invention is to provide a feeder utilizing a cup for containing the food and from which the rabbits eat, and protecting and support structure for the cup which can be made of metal, plastic or vitreous materials, including glass, or a combination thereof, which cup and structure is easy and inexpensive to manufacture, and can be easily maintained in a sanitary condition, thereby reducing the labor and other expenses of feeding.

Other important objects and advantages of the invention will be apparent from a reading of the following description and the appended drawings, wherein a preferred embodiment of the invention is set forth for illustration only.

Figure 1:
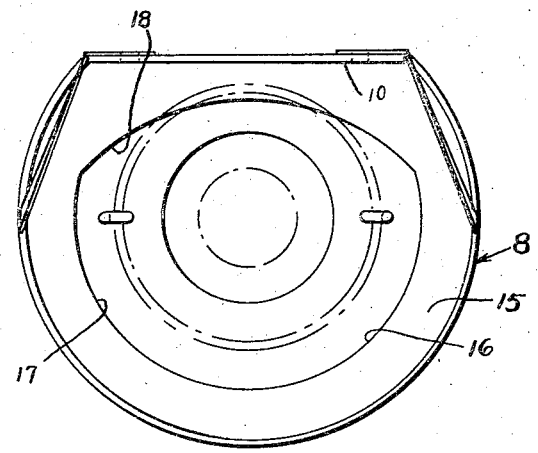
Figure 1 is a top plan view of the device showing the associated cup in phantom lines.
Figure 3:
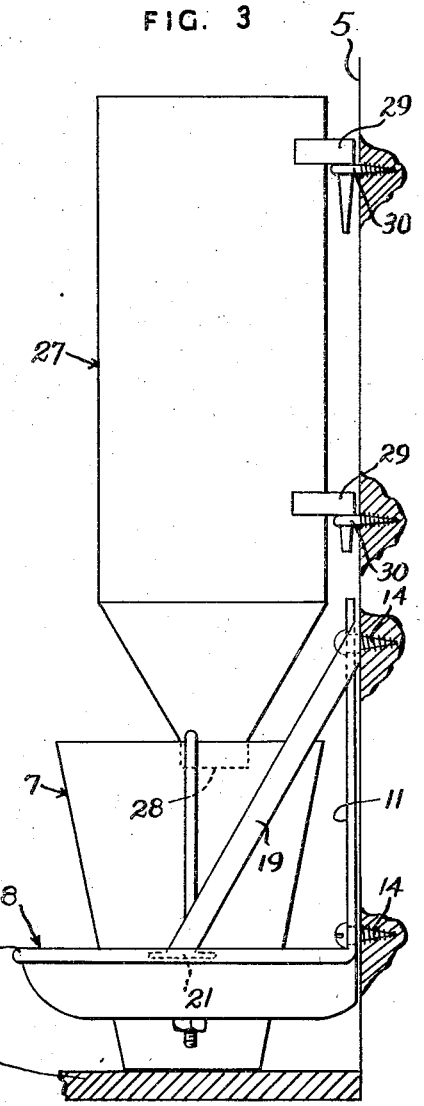
Figure 3 is a side elevation showing the complete device including an inverted liquid food dispensing bottle associated with the cup.
Figure 2:
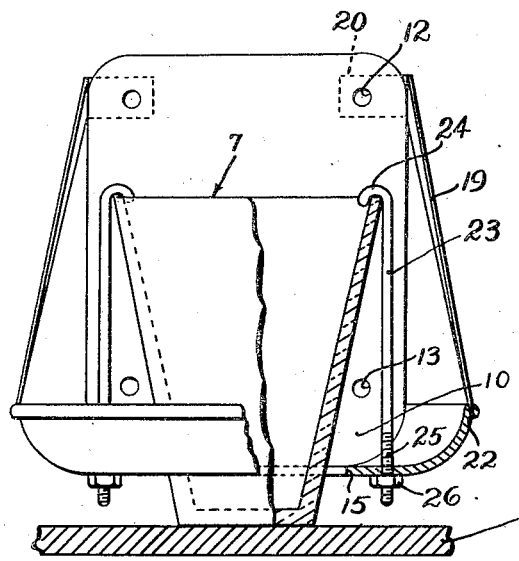
Figure 2 is a front elevation of the device partly broken away to show the association of the cup.

Referring in detail to the drawings, the numeral 5 generally designates a vertical wall of the rabbit hutch or the like which has a floor or other horizontal supporting surface 6 for the feeding cup 7 which may be of any suitable generally conical shape, and be of any suitable material to sanitarily contain the solid or liquid food (not shown). Spacedly surrounding the cup is the tray 8 which is preferably about three-quarter in form and pan-shaped with a rolled upper edge 9, the non-circular back portion 10 merging with the lower end of the back plate 11, which has upper and lower pairs of bolt or screw holes 12 and 13, respectively, to accommodate the screws or bolts 14 whereby the back plate is secured to the wall 11 to securely support the tray 9 above the floor 6 and at a height relative to the top of the cup 7 to catch the solid or liquid food which may be displaced over the upper edge of the cup in the act of feeding.

The tray 8 is large enough in diameter to catch the displaced food, and is placed at such a height that the rabbits can feed from the cup only by standing on the floor 6 with their hind legs and resting their front paws on the edge of the tray and cannot urinate or manure in the tray 8 and spoil food therein or in the cup 7. The tray bottom 15 has a centralized opening 16 more than half of whose edge is concentrically spaced from the cup 7 as indicated at 17, with the remaining rear portion having a diminished curvature as indicated at 18 so as to approach relatively closely to the back side of the cup and resist rearward tipping of the cup.

When the device is made of sheet metal additional support for the tray from the back plate 11 is advisable, in the form of diagonal metal straps 19 having ears 20 at their upper ends soldered behind the upper corners of the back plate and having holes registered with the upper bolt holes 12. The lower ends of the braces have cross heads 21 removably inserted in slots 22 formed in the rolled edge 9 of the tray 8.

For holding the cup 7 down in place on the floor 6 the tray has vertical rods 23 disposed at diametrically opposite sides of the cup and provided with hooked upper ends 24 to engage over the upper edge of the cup, and threaded lower ends 25 passing through the bottom of the tray and provided with nuts 26 which are run up tight against the tray bottom to hold the cup in place.

When liquid instead of solid food is used in the feeding cup 7, a dispensing bottle 27 is employed with the above described structure with the lower end of its reduced neck 28 inserted into the upper end of the cup to a depth sufficient only to seal off the flow of liquid from the mouth of the bottle with the liquid in the cup, except as liquid is consumed from the cup.

The bottle has upper and lower pairs of hook lugs 29 to engage in eyes 30 secured to the vertical hutch wall 5 to support the bottle at the proper level after the bottle has been inverted with the hand of the operator covering the mouth of the bottle and settled in the upper end of the cup.

What I claim is:

1. A feeder for rabbits and the like comprising a horizontal support and a vertical support, a feeding cup resting on the horizontal support adjacent to the vertical support, a vertical back plate secured to the vertical support, a horizontal tray projecting from the lower part of the back plate above the horizontal support at a level below the upper edge of the cup and formed with an opening in its bottom spacedly surrounding the sides of the cup.

2. A feeder for rabbits and the like comprising a horizontal support and a vertical support, a feeding cup resting on the horizontal support adjacent to the vertical support, a vertical back plate secured to the vertical support, a horizontal tray projecting from the lower part of the back plate above the horizontal support at a level below the upper edge of the cup and formed with an opening in its bottom spacedly surrounding the sides of the cup, and hook means on the tray engaging over the upper edge of said cup and holding the feeding cup in place on the horizontal support and in spaced relation to the edge of the opening in the bottom of the tray.

3. A feeding device for use in a rabbit hutch or the like comprising a rabbit feeding cup with the cup adapted to rest on the floor adjacent to a vertical wall of the hutch, a substantially annular tray spacedly surrounding the cup to catch food displaced from the cup by the rabbits, and a back plate secured to the tray and adapted to support the tray from said wall at a level below the upper edge of the cup and at a sufficient elevation above the floor to force the rabbits to reach the food in the cup by resting their front paws on the tray while standing on the floor.

4. A feeding device for use in a rabbit hutch or the like comprising a rabbit feeding cup with the cup adapted to rest on the floor adjacent to a vertical wall of the hutch, a substantially annular tray spacedly surrounding the cup to catch food displaced from the cup by the rabbits, a back plate secured to the tray and adapted to support the tray from said wall at a level below the upper edge of the cup and at a sufficient elevation above the floor to force the rabbits to reach the food in the cup by resting their front paws on the tray while standing on the floor, and hooks on the tray for engaging over the upper edge of the feeding cup to hold the cup in place on the floor and in substantially concentrically spaced relation to the tray.

HOWARD E. MOREY.

REFERENCES CITED

The following references are of record in the file of this patent:

UNITED STATES PATENTS

| Number | Name | Date |
|---|---|---|
| 479,549 | Botsford | July 26, 1892 |